United States Patent [19]
Coor

[11] 3,793,599
[45] Feb. 19, 1974

[54] ROTATING CAPACITOR SQUARE WAVE FILTER AND APPLICATIONS THEREOF

[75] Inventor: Thomas Coor, Princeton, N.J.

[73] Assignee: Princeton Applied Research Corporation, Princeton, N.J.

[22] Filed: Jan. 26, 1973

[21] Appl. No.: 327,146

[52] U.S. Cl. ............... 333/70 A, 324/118, 328/165, 328/167
[51] Int. Cl. ..... H03h 7/10, G01r 19/02, G01r 19/18
[58] Field of Search ...... 333/70 A, 70 CR; 307/240; 328/139, 165–167; 324/118, 119, 120

[56] References Cited
UNITED STATES PATENTS 3,125,733 12/1970 Webb ................................ 328/165

*Primary Examiner*—Rudolph V. Rolinec
*Assistant Examiner*—Marvin Nussbaum
*Attorney, Agent, or Firm*—Popper, Bain, Bobis, Gilfillian & Rhodes

[57] ABSTRACT

Filtering a zero median value square wave signal having predetermined transitions out of a composite signal including said square wave signal and other signals, including applying said composite signal to the input of a rotating capacitor square wave signal filter including a rotating capacitor C connected between terminals T1 and T2 and an electrically associated resistor R, and repetitively reversing the connection of the capacitor C to the terminals T1 and T2 in synchronism with the transitions of the square wave signal whereby, upon the RC time constant of the resistor R and the capacitor C being much greater than the period of the square wave signal, substantially only the square wave signal is across the output of the rotating capacitor square wave signal filter; and applications thereof.

31 Claims, 8 Drawing Figures

ROTATING CAPACITOR SQUARE WAVE FILTER AND APPLICATIONS THEREOF

BACKGROUND OF THE INVENTION

In the prior art square wave signals have been filtered in various ways, for example, by the well-known two capacitor N-path filter. The major problem of such prior art square wave filters is that they do not reject DC.

SUMMARY

The present invention provides useful and new processes and apparatus for filtering a square wave signal, in particular a zero median value square wave signal, and which provide new and improved results, inter alia, in that they reject DC.

Such new and useful results are accomplished by applying a composite signal, including a square wave signal and other signals, to the input of a rotating capacitor square wave signal filter including a rotating capacitor C connected between terminals T1 and T2 and an electrically associated resistor R, and by repetitively reversing the connection of the capacitor C to the terminals T1 and T2 in synchronism with the transitions of the square wave signal whereby, upon the RC time constant of the resistor R and the capacitor C being much greater than the period of the square wave signal, substantially only the square wave signal is provided across the output of the rotating capacitor square wave signal filter.

DESCRIPTION OF THE INVENTION

Referring generally to FIGS. 1–4, there are shown various apparatus for practicing the processes of the present invention for filtering a square wave signal out of a composite signal including the square wave signal and other unwanted signals such as other AC signals, DC, noise, etc. Still further generally, it will be noted that each apparatus includes a capacitor C and an electrically associated resistor R which will be treated in detail below.

Figure 1:
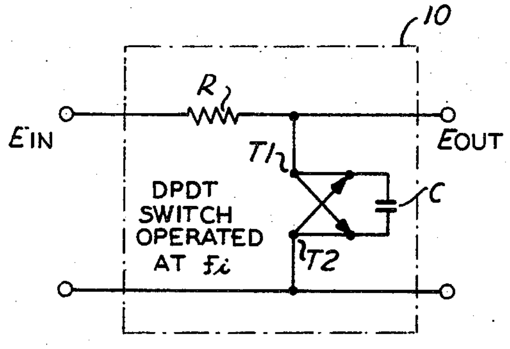
FIGS. 1–4 illustrate various embodiments of rotating capacitor square wave filters.

With regard to the apparatus of FIG. 1, such apparatus is provided with an input and output as shown and includes resistor R connected in series with capacitor C which is connected to terminals T1 and T2 through a double pole double throw (DPDT) switch which upon being operated alternately reverses the connection of the capacitor C to the terminals T1 and T2; such apparatus being disclosed in the prior art by Y. Sun, Network Functions of Quadrature N-Path Filters, *IEEE Trans. Circuit Theory*, Vol. CT–17, pp. 594–600, November 1970, and such apparatus being disclosed as having a small response at zero frequency and a response peak at the frequency *fs*, the frequency at which the DPDT switch is operated. However, and in accordance with the teachings of the present invention, it has been discovered that the apparatus of FIG. 1 is unexpectedly useful for filtering a square wave signal of frequency $f_i$ out of a composite signal including the square wave signal and other signals, and it has been further discovered that such apparatus has, in fact, ideal characteristics as a matched, narrow band filter for filtering a symmetrical, zero median square wave signal at frequency fi out of such composite signal.

Figure 2:
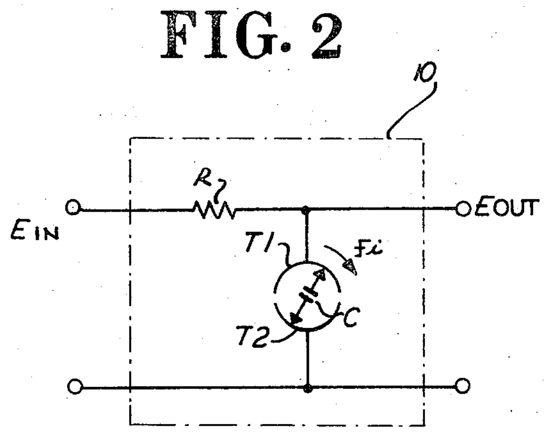

Referring now to FIG. 2, the symbolization of the DPDT switch is replaced by a symbolization  $f_i$ that more graphically illustrates the action of the capacitor C having its connection to the terminals T1 and T2 reversed or cummutated. Capacitor C may thus be visualized or understood as being commutated, reversed or switched at a frequency $f_i$ between the terminals T1 and T2 with the switching operation being considered to be instantaneous. Such capacitor being referred to hereinafter as a "rotating capacitor" of frequency $f_i$, the capacitor being carried through a full cycle of reversal or rotation in a time $=1/f_i$. However, it will be further understood that the expression "rotating capacitor" is also used to include such embodiments as the capacitor C of FIG. 1 and well as any other embodiment of such capacitor C for having its connection to a pair of terminals, such as terminals T1 and T2 reversed. The reversal of the connection of the rotating capacitor C at frequency $f_i$ may be accomplished mechanically such as by the DPDT switch of FIG. 1, by a motor, or electrically such as by solid state switches operated at frequency $f_i$; such reversing means not being shown in FIGS. 2 and 3.

Figures 3, 4:
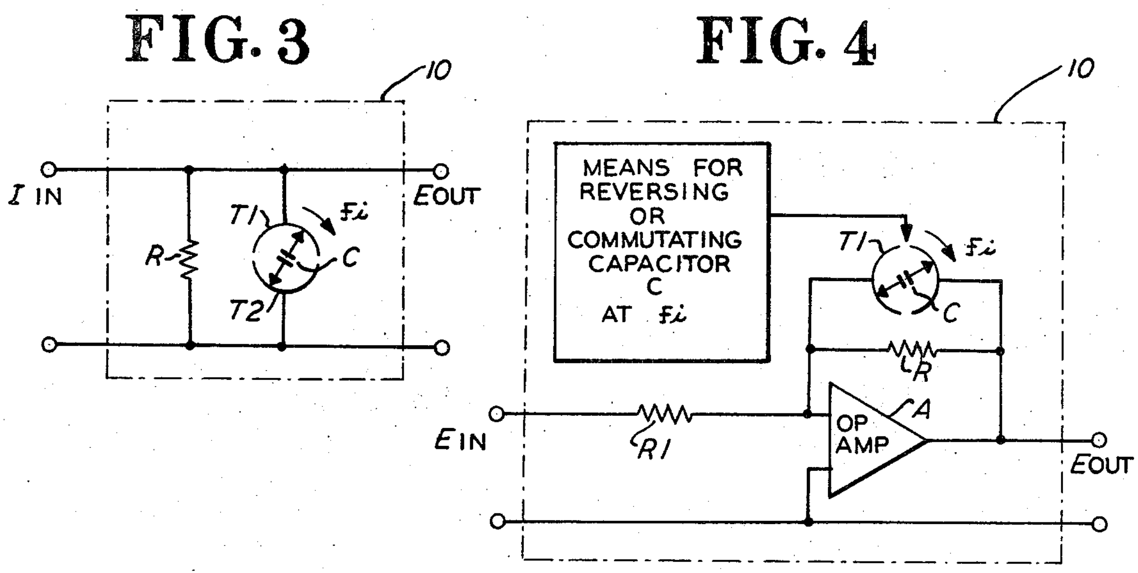

Shown in FIG. 3 is an embodiment wherein the resistor R is electrically associated with the rotating capacitor C by being connected in parallel with the rotating capacitor; the means for reversing or commutating the capacitor C not being shown.

The apparatus of FIGS. 1 and 2, wherein resistor R is connected in series with rotating capacitor C, are for receiving the composite signal in the form of a voltage signal; and, the apparatus of FIG. 3 is for receiving the composite signal in the form of a current signal.

Referring now to FIG. 4 there is shown novel apparatus utilizing the rotating capacitor and which novel apparatus is particularly useful in practicing the filtering processes of the present invention. Shown in FIG. 4 is an operational amplifier A, which may be any one of several suitable operational amplifiers known to the art, an input resistor R1 and an amplifier feed-back network including resistor R and rotating capacitor C connected in parallel as shown in FIG. 4. The operational amplifier A is connected as an inverting summing amplifier and is provided with inputs and outputs as shown. Also shown schematically in FIG. 4 are suitable means for reversing or commutating rotating capacitor C at frequency $f_i$, such as for example, a suitable solid state switch or switches referred to above.

It will be further understood by those skilled in the art that the apparatus included in the dashed rectangular outline shown in FIGS. 1–4, and given general numerical designation 10, is referred to hereinafter as a "rotating capacitor square wave signal filter."

Referring now specifically to the practice of the processes of the present invention as may be practiced by each of the rotating capacitor square wave signal filters of FIGS. 1–4 for filtering a zero median value square wave signal having known transitions, i.e., a zero median value square wave signal of known phase and frequency and which known frequency will be referred to as frequency $f_i$ out of a composite signal including such square wave signal and other signals, such as other AC signals, other AC signals and DC, noise, etc., such composite signal is applied to the input of such rotating capacitor square wave signal filter and the connection of the rotating capacitor C is repetitively reversed to the terminals T1 and T2 in synchronism with the transitions of the square wave signal to be filtered, i.e., the rotating capacitor C has its connection to the terminals T1 and T2 reversed in phase with and at the frequency $f_i$ of the square wave signal to be filtered out of the composite signal. The rotating capacitor C and its electrically associated resistor R are chosen such that their RC time constant is much greater than the period of the square wave signal to be filtered, hence, substantially only the median value square wav signal will appear or be provided across the output of the rotating capacitor square wave signal filters; the other signals of the composite signal, in particular DC, being rejected or attenuated and substantially not passing through said rotating capacitor square wave filter. More particularly, in the rotating capacitor square wave filters 10 of FIGS. 1–3, the filtered square wave signal will appear across the terminals T1 and T2 to which the output of the filters is connected, and in the rotating capacitor square wave filter 10 of FIG. 4 the filtered square wave signal will appear across the output of the inverting summing amplifier.

Referring again specifically to FIG. 4, the filtered square wave signal provided at the output of the inverting summing amplifier will be amplified by a factor equal to the resistor ratio, R/R1. The "band-width" of the rotating capacitor square wave filter of FIG. 4 is proportional to 1/RC, and is best described as a synchronous matched filter for zero median value square waves, especially, symmetrical square waves of zero median value.

It will be understood further with regard to the practice of the above-described processes of the present invention as practiced by the rotating capacitor square wave signal filters of FIGS. 1–4, that where the zero median value square wave signal to be filtered is a symmetrical square wave and where the other signals of said composite signal are other AC signals and/or DC signals, substantially only the symmetrical square wave signal appears or is provided at the output of the filter; that where the zero median value square wave signal is a non-symmetrical square wave signal and where the other signals of the composite signal are other AC signals, substantially only the non-symmetrical square wave signal appears or is provided at the output of the filter; and that where the zero median value square wave signal is a non-symmetrical square wave and the other signals are other AC signals and DC signal, substantially only said non-symmetrical square wave signal and portions of said DC signal appear or are provided at the output of the filter.

Figure 5:
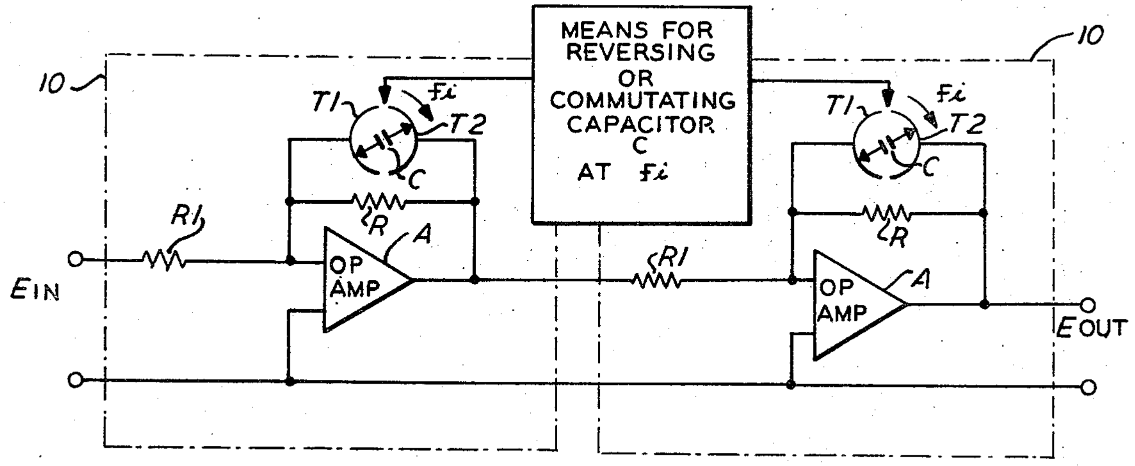
FIG. 5 illustrates a cascade of rotating capacitor square wave filters.

In accordance with the further teachings of the present invention, it has been found that sharper response characteristics can be achieved by cascading two or more rotating capacitor square wave filters 10, operated in synchronism at frequency $f_i$, as illustrated in FIG. 5.

APPLICATIONS OF ROTATING CAPACITOR SQUARE WAVE FILTERS

It will be understood by those skilled in the art that the above-described rotating capacitor square wave filters will have numerous applications in instrumentation and communication electronic circuitry.

Figure 6:
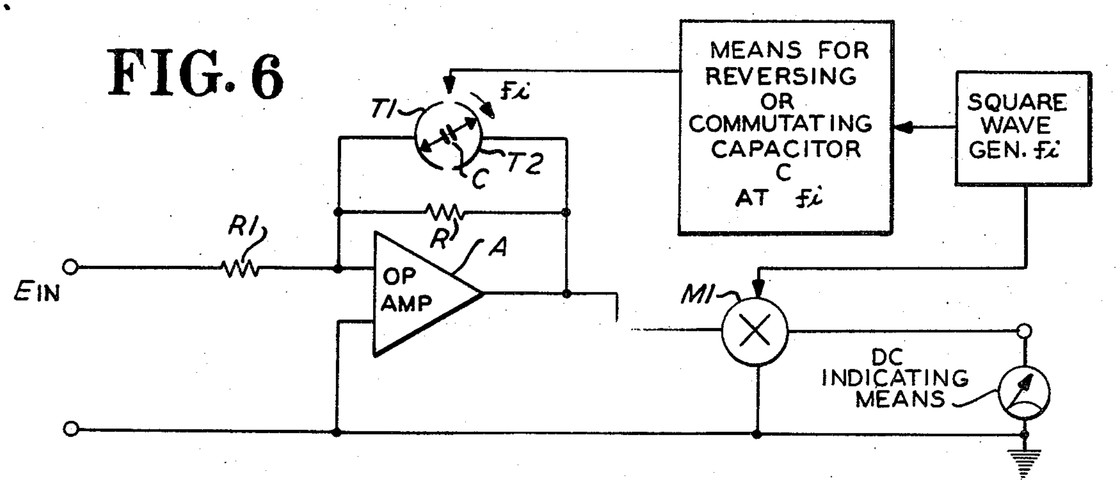
FIG. 6 illustrates a manner in which a DC indication of amplitude of a filtered square wave signal can be provided.

For example, the measurement of small amplitude square wave signals of known frequency and phase in the presence of large amplitude noise can be accomplished advantageously by combining the rotating capacitor square wave filter 10, of FIGS. 1–4, with a synchronous rectifier or detector such as a switching type phase reversing multiplier or demodulator M1 as shown in FIG. 6, the rotating capacitor square wave filter 10 of FIG. 4 being actually shown in FIG. 5, however, it will be understood that the rotating capacitor square wave filters 10 of FIGS. 1–3 could also be combined with the multiplier M1 of FIG. 6. The multiplier M1, or synchronous rectifier or demodulator, is operated in synchronism with the transitions of the filtered square wave signal and the reversing of the rotating capacitor C. More specifically, the multiplier Ml may receive the filtered square wave signal and a square wave signal in phase with and at the frequency $f_i$ of the filtered square wave signal, which may be provided by a suitable square wave generator 14 (which generator may also be used to operate the means for reversing or commutating the rotating capacitor C as shown), and the phase-reversing switching type multiplier M1 will multiply or synchronously rectify or demodulate, the received square wave signals and provide a DC signal which will be proportional to the amplitude of the filtered square wave signal. Such DC signal may be indicated by suitable DC indicating means such as the DC meter shown. With regard to such DC signal being "proportional" to the magnitude of the filtered square wave signal, if the gain of the filter, e.g. the ratio of R/R1, is one, the DC signal will be equal to, or substantially equal to, one-half of the peak-to-peak amplitude of the filtered square wave signal of zero median value.

Figure 7:
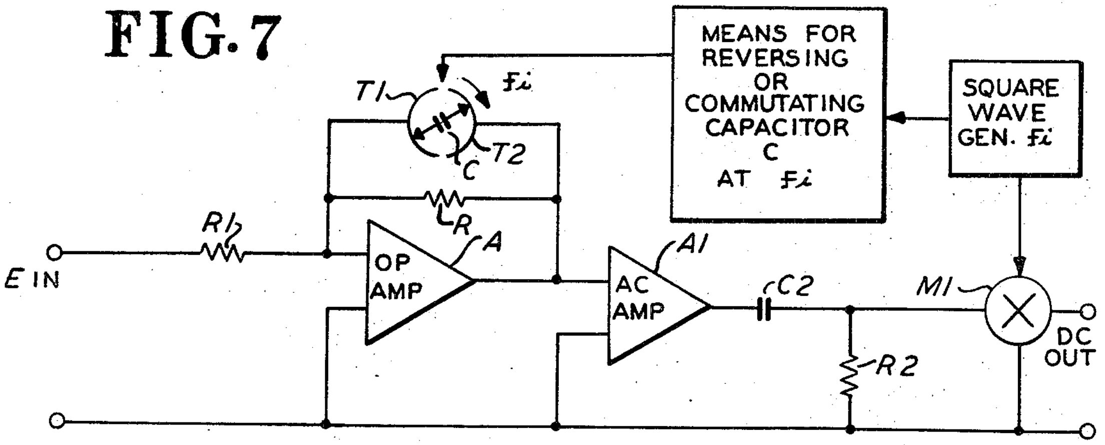
FIGS. 7 and 8 illustrate various utilizations of the rotating capacitor square wave filter of the present invention.

It will be further understood by those skilled in the art that the apparatus of FIG. 6 will be optimally responsive to symmetrical square wave synchronous with the frequency $f_i$. The response to input noise and off-frequency (not $f_i$) coherent signals can be made arbitrarily small by reducing the bandwidth (1/RC) of the rotating capacitor square wave filter, i.e., by increasing the RC time constant. Because the signals of interest at point Q in FIG. 6 are zero median square wave signals of frequency $f_i$, and have been bandwidth limited to an arbitrary degree by the rotating capacitor square wave filter 10, the utility of the circuit of FIG. 6 may be advantageously enhanced by the addition of AC amplification means, such as a suitable AC amplifier A1, and/or suitable high pass filtering means C2–R2 such as shown in FIG. 7, wherein such AC amplifier and/or high pass filter are connected intermediate the output of the rotating capacitor square wave filter 10 and the synchronous rectifier or phase reversing switching type multiplier M1. The high pass filter, C2–R2, further removes any DC and low frequency signals included in the filtered composite signal prior to synchronous rectification by the multiplier M1, and prevents DC drifts and offsets from the operational amplifier A and AC amplifier A1 from being converted into square waves at the frequency $f_i$ by the multiplier, modulator, or synchronous rectifier, M1.

It will be further understood by those skilled in the art that the apparatus or circuit of FIG. 7 is particularly useful for band limiting, detecting and measuring the amplitude of a small square wave signal in the presence of large noise. Further, because of the noise-rejecting properties of the rotating capacitor square wave filter 10, the dynamic range requirements on the additional amplification means, e.g. AC amplifier A1, are greatly reduced.

Figure 8:
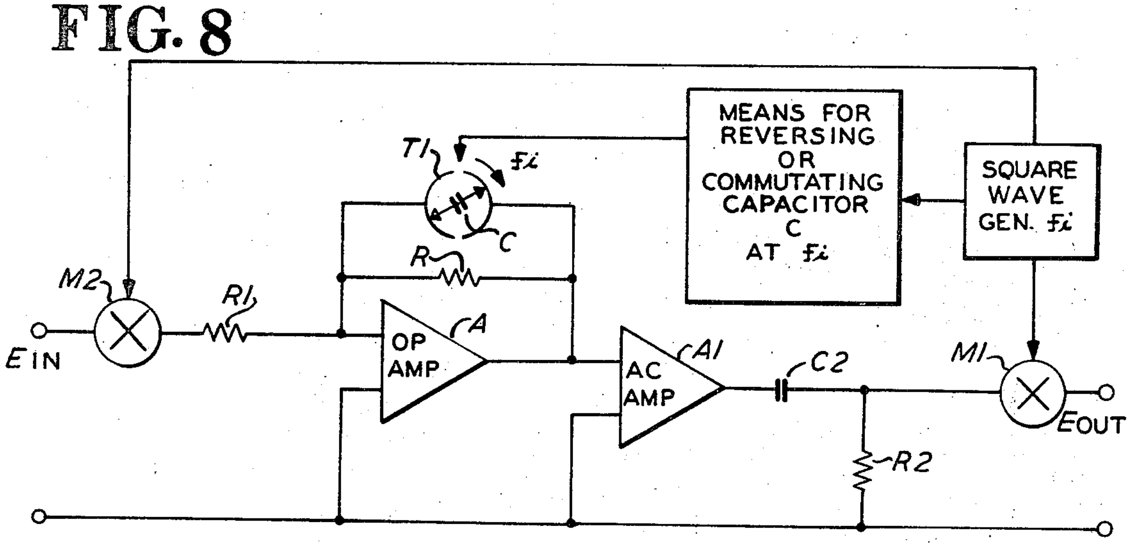

A further application of the rotating capacitor filter 10 is in a carrier-type DC and low frequency amplifier as shown in FIG. 8. The circuit of FIG. 8 is the same as that shown in FIG. 7 except that a phase reversing switching type modulator, or multiplier, M2 has been added prior to the input of the rotating capacitor square wave filter 10.

The apparatus or circuit of FIG. 8 has been found to be particularly useful in amplifying only the, or substantially only the, DC and low frequency signals found in a composite signal including such DC and low frequency signals and high frequency signals. Such composite signal is applied to the input of the circuit whereupon the composite signal is modulated by modulator M2 by being repetitively reversed in polarity in accordance with the sign of a square wave signal of frequency $f_i$ wherein the frequency $f_i$ is less than the period of the low frequency signals. The composite signal is then fed into the rotating capacitor square wave filter 10 and the balance of the circuit operates and functions as taught above above with regard to the application circuit shown in FIG. 7.

The RC time constant is made much greater than the period of the square wave signal $f_i$ and is made less than the period of the low frequency signals to be amplified. The frequency response of the circuit of FIG. 8 is flat from DC out to a frequency $f_c = 1/2\pi RC$ where it will begin to fall off at approoximately 6 db. per octave. There are no spurious responses for input frequencies at or near frequency $f_i$, nor for any frequency whatsoever.

It will be understood that many modifications can be made in the present invention without departing from the spirit and scope thereof.

What is claimed is:

1. The process of filtering a zero median value square wave signal having predetermined transitions out of a composite signal including said square wave signal and other signals, comprising the steps of:

applying said composite signal to the input of a rotating capacitor square wave signal filter including a rotating capacitor C connected between terminals T1 and T2 and an electrically associated resistor R; and repetitively reversing the connection of said capacitor C to said terminals T1 and T2 in synchronism with the transitions of said square wave signal whereby, upon the RC time constant of said resistor R and said capacitor C being much greater than the period of said square wave signal, substantially only said square wave signal being provided across the output of said rotating capacitor square wave signal filter.

2. The process according to claim 1 wherein said rotating capacitor square wave filter includes said resistor R connected in series with said capacitor C and wherein said composite signal is a voltage signal and is applied across the series connection of said resistor R and said capacitor C.

3. The process according to claim 1 wherein said rotating capacitor square wave filter includes said resistor R connected in parallel with said capacitor C and wherein said composite signal is a current signal and is applied across the parallel connection of said resistor R and said capacitor C.

4. The process according to claim 1 wherein said rotating capacitor square wave filter includes an operational amplifier connected as an inverting summing amplifier and wherein said capacitor C and resistor R are connected in parallel in the feed-back network of said inverting summing amplifier and wherein said composite signal is applied to the input of said inverting summing amplifier and wherein said square wave signal appears across the output of said inverting summing amplifier.

5. The process according to claim 1 wherein said square wave signal of zero median value is a symmetrical square wave signal and wherein said other signals of said composite signal are other AC and/or DC signals, substantially only said symmetrical square wave signal is provided across the output of said rotating capacitor square wave filter, and wherein said process provides substantially an ideal matched filter for said symmetrical square wave signal.

6. The process according to claim 1 wherein said square wave signal of zero median value is a non-symmetrical square wave signal and wherein said other signals of said composite signal are other AC signals, whereby substantially only said non-symmetrical square wave signal is provided across the output of said rotating capacitor square wave filter.

7. The process according to claim 1 wherein said square wave signal of zero median value is a non-symmetrical square wave signal and wherein said other signals of said composite signal are other AC signals and DC, whereby substantially only said non-symmetrical square wave signal and portions of said DC signal are provided across the output of said rotating capacitor square wave filter.

8. The process of providing a DC indication of a magnitude proportional to the amplitude of a square wave signal having predetermined transitions and included in a composite signal including said square wave signal and other signals, comprising the steps of:

A. filtering said square wave signal out of said composite signal by:

i. applying said composite signal to a rotating capacitor square wave filter including a capacitor C and an electrically associated resistor R, said capacitor C being connected between terminals T1 and T2, and ii. repetitively reversing the connection of said capacitor C to said terminals T1 and T2 in synchronism with the transitions of said square wave signal whereby, upon the RRC time constant of said resistor R and capacitor C being much greater than the period of said square wave signal, substantially only said square wave signal is provided across the output of said amplifier A, and B. synchronously rectifying said filtered square wave signal in synchronism with said predetermined transnsitions thereof to provide said DC indication of a magnitude proportional to the amplitude of said square wave signal.

9. The process according to claim 8 wherein said synchronous rectification is accomplished by feeding said filtered square wave signal and a second predetermined square wave signal in phase with and at the same frequency of said filtered square wave signal into a switching type phase reversing multiplier wherein said square wave signals are multiplied and whereby the output signal of said switching type phase reversing multiplier is said DC signal of a magnitude proportional to the amplitude of said filtered square wave signal.

10. The process according to claim 8 including the further step of amplifying said filtered square wave signal prior to said synchronous rectification.

11. The process according to claim 8 including the further step of passing said filtered square wave signal through a high pass filter to further remove any DC and low frequency signals included in said filtered square wave signal prior to said synchronous rectification.

12. The process according to claim 8 including the further steps of amplifying said filtered square wave signal and passing said amplified filtered square wave signal through a high pass filter to further remove any DC and low frequency signals included in said filtered square wave signal prior to said synchronous rectification.

13. The process of amplifying DC and low frequency signals included in a composite signal which composite signal also includes high frequency signals, comprising the steps of:

modulating said composite signal by repetitively reversing the polarity of said composite signal in accordance with the sign of a first predetermined square wave signal having predetermined transitions and having a frequency much greater than the frequency of said low frequency signals;

applying said composite signal repetitively reversed in polarity to a rotating capacitor square wave filter including a capacitor C connected between terminals T1 and T2 and an electrically associated resistor R;

repetitively reversing the connection of said capacitor C to said terminals T1 and T2 in synchronism with said transitions of said predetermined square wave signal, whereby, upon the RC time constant of said resistor R and capacitor C being much greater than the period of said predetermined square wave signal and less than the period of said low frequency signals, substantially only a second predetermined square wave signal in phase with and at the frequency of said first square wave signal appearing at the output of said rotating capacitor square wave filter, the peak-to-peak amplitude of said second predetermined square wave signal being substantially proportional to only the instantaneous magnitude of said DC and low frequency signals; and synchronously rectifying said second predetermined square wave signal in accordance with said predetermined transitions of said predetermined square wave signal to provide a DC indication of a magnitude substantially proportional to the instantaneous magnitude of said DC and low frequency signals.

14. The process according to claim 13 wherein said synchronous rectification is accomplished by feeding said second predetermined square wave signal and a third predetermined square wave signal in phase with and at the same frequency of said second predetermined square wave signal into a switching type phase reversing multiplier wherein said second and third predetermined square wave signals are multiplied and whereby the DC output signal of said switching type phase reversing multiplier is said DC signal of a magnitude proportional to the amplitude of said filtered square wave signal.

15. The process according to claim 13 including the further step of amplifying said filtered second predetermined square wave signal prior to said synchronous rectification.

16. The process according to claim 13 including the further step of passing said filtered second predetermined square wave signal through a high pass filter to further remove any DC and low frequency signals included in said filtered second predetermined square wave signal prior to said synchronous rectification.

17. The process according to claim 13 including the further steps of amplifying said filtered second predetermined square wave signal and passing said amplified filtered second predetermined square wave signal through a high pass filter to further remove any DC and low frequency signals included in said filtered second predetermined square wave signal prior to said synchronous rectification.

18. Apparatus for filtering a zero median value square wave signal having predetermined transitions out of a composite signal including said square wave signal and other signals, comprising:

a rotating capacitor square wave signal filter including a rotating capacitor C, connected between terminals T1 and T2, and an electrically associated resistor R, said rotating capacitor square wave filter having an input for receiving said composite signal; and means for repetitively reversing the connection of said capacitor C to said terminals T1 and T2 in synchronism with the transitions of said square wave signal whereby, upon said composite signal being applied to said input and upon the RC time constant of said resistor R and said capacitor C being much greater than the period of said square wave signal, substantially only said square wave signal being provided across the output of said rotating capacitor square wave signal filter.

19. Apparatus according to claim 18 wherein said rotating capacitor square wave filter includes said resistor R connected in series with said capacitor C and wherein said composite signal is a voltage signal and is applied across the series connection of said resistor R and said capacitor C.

20. Apparatus according to claim 18 wherein said rotating capacitor square wave filter includes said resistor R connected in parallel with said capacitor C and wherein said composite signal is a current signal and is applied across the parallel connection of said resistor R and said capacitor C.

21. Apparatus according to claim 18 wherein said rotating capacitor square wave filter includes an operational amplifier connected as an inverting summing amplifier and wherein said capacitor C and resistor R are connected in parallel in the feed-back network of said inverting summing amplifier and wherein said composite signal is applied to the input of said inverting summing amplifier and wherein said square wave signal appears across the output of said inverting summing amplifier.

22. Apparatus for providing a DC indication of a magnitude proportional to the amplitude of a square wave signal having predetermined transitions and included in a composite signal including said square wave signal and other signals, comprising:

A. means for filtering said square wave signal out of said composite signal including:

i. a rotating capacitor square wave filter including a capacitor C and an electrically associated resistor R, said capacitor C being connected between terminals T1 and T2, and said filter having an input for receiving said composite signal and having an output, and ii. means for repetitively reversing the connection of said capacitor C to said terminals T1 and T2 in synchronism with the transitions of said square wave signal whereby, upon said composite signal being applied to said filter input and upon the RC time constant of said resistor R and capacitor C being much greater than the period of said square wave signal, substantially only said square wave signal being provided across the output of said amplifier A; and b. means for synchronously rectifying said filtered square wave signal in synchronism with said predetermined transitions thereof to provide said DC indication of a magnitude proportional to the amplitude of said square wave signal.

23. Apparatus according to claim 22 wherein said means for synchronous rectification includes a square wave signal generator for providing a second predetermined square wave signal in phase with and at the same frequency of said filtered square wave signal and a switching type phase reversing multiplier for receiving said square wave signals and for multiplying said square wave signals and for providing a DC output signal which is said DC signal of a magnitude proportional to the amplitude of said filtered square wave signal.

24. Apparatus according to claim 22 further including amplifying means connected intermediate said filtering means and said synchronous rectifying means and for amplifying said filtered square wave signal prior to said synchronous rectification.

25. Apparatus according to claim 22 further including a high pass filter connected intermediate said filtering means and said synchronous rectifying means and for further filtering said square wave signal by further removing any DC and low frequency signals included in said filtered square wave signal prior to said synchronous rectification.

26. Apparatus according to claim 22 further including amplifying means and a high pass filter connected intermediate said filtering means and said synchronous rectifying means and for amplifying and further filtering said filtered square wave signal to further remove any DC and low frequency signals included in said filtered square wave signal prior to said synchronous rectification.

27. Apparatus for amplifying DC and low frequency signals included in a composite signal which composite signal also includes high frequency signals, comprising:

means for modulating said composite signal by repetitively reversing the polarity of said composite signal in accordance with the sign of a first predetermined square wave signal having predetermined transitions and having a frequency much greater than the frequency of said low frequency signals;

a rotating capacitor square wave filter including a capacitor C, connected between terminals T1 and T2, and an electrically associated resistor R, said filter having an input for receiving said composite signal repetitively reversed in polarity and an output;

means for repetitively reversing the connection of said capacitor C to said terminals T1 and T2 in synchronism with said transitions of said predetermined square wave signal, whereby, upon said composite signal being applied to said filter input and upon the RC time constant of said resistor R and capacitor C being much greater than the period of said predetermined square wave signal and less than the period of said low frequency signals, substantially only a second predetermined square wave signal in phase with and at the frequency of said first square wave signal appearing at the output of said rotating capacitor square wave filter, the peak-to-peak amplitude of said second predetermined square wave signal being substantially proportional to only the instantaneous magnitude of said DC and low frequency signals; and means for synchronously rectifying said second predetermined square wave signal in accordance with said predetermined transitions of said predetermined square wave signal to provide a DC indication of a magnitude substantially proportional to the instantaneous magnitude of said DC and low frequency signals

28. Apparatus according to claim 27 wherein said means for synchronous rectification includes a square wave signal generator for providing a third predetermined square wave signal in phase with and at the same frequency of said filtered second predetermined square wave signal and a switching type phase reversing multiplier for receiving said second and third predetermined square wave signals and for multiplying said second and third predetermined square wave signals and for providing a DC output signal which is said DC signal of a magnitude proportional to the amplitude of said filtered square wave signal.

29. Apparatus according to claim 27 further including amplifying means connected intermediate said rotating capacitor square wave filter and said synchronous rectifying means and for amplifying said filtered second predetermined square wave signal prior to said synchronous rectification.

30. Apparatus according to claim 27 further including a high pass filter connected intermediate said rotating capacitor square wave filter and said synchronous rectifying means and for further removing any DC and low frequency signals included in said filtered second predetermined square wave signal prior to said synchronous rectification.

31. Apparatus according to claim 27 further including amplifying means and a high pass filter connected intermediate said rotating capacitor square wave filter and said synchronous rectifying means and for amplifying said filtered second predetermined square wave signal and for further removing any DC and low frequency signals included in said filtered second predetermined square wave signal prior to said synchronous rectification.

* * * * *